(12) United States Patent
Bakke et al.

(10) Patent No.: US 7,150,642 B1
(45) Date of Patent: Dec. 19, 2006

(54) IRRIGATION CONTROL SYSTEM

(76) Inventors: John S. Bakke, 1247 Lorelei Ct., Campbell, CA (US) 95008-1716; David C. Bakke, 1247 Lorelei Ct., Campbell, CA (US) 95008-1716

( * ) Notice: Subject to any disclaimer, the term of this patent is extended or adjusted under 35 U.S.C. 154(b) by 0 days.

(21) Appl. No.: 10/865,320

(22) Filed: Jun. 10, 2004

(51) Int. Cl.
    *H01R 13/52* (2006.01)
(52) U.S. Cl. .................................. 439/271; 439/638
(58) Field of Classification Search ........ 439/271–275, 439/281–283, 278–279, 350, 638, 277
    See application file for complete search history.

(56) References Cited

U.S. PATENT DOCUMENTS

| | | | |
|---|---|---|---|
| 4,113,339 A | * | 9/1978 | Eley ............................ 439/183 |
| 4,609,247 A | * | 9/1986 | Annoot ........................ 439/591 |
| 6,848,930 B1 | * | 2/2005 | Fukuda ....................... 439/349 |

\* cited by examiner

*Primary Examiner*—Javaid H. Nasri
(74) *Attorney, Agent, or Firm*—Howard C. Miskin, esq.; Gloria Tsui-Yip, esq.

(57) ABSTRACT

An irrigation control system having a master control, a plurality of electrical components and at least two coupling devices for connecting one of the electrical components to the master control. The coupling device has a male connector housing and a female connector housing. Each connector housing has first and second ends, with the first ends connected to either the master control or the electrical components. The second end of the male connector housing has a male connector and the second end of the female connector housing has a female connector, which cooperatively mates with a corresponding male connector. The male and female connector housings sealingly mate together to prevent moisture or liquid from entering the male and female connectors. Each connector housing provides a flat area for identification of each connection. The coupling device can be repeatedly taken apart and reconnected without having to replace the coupling device, as with other prior art connectors.

12 Claims, 6 Drawing Sheets

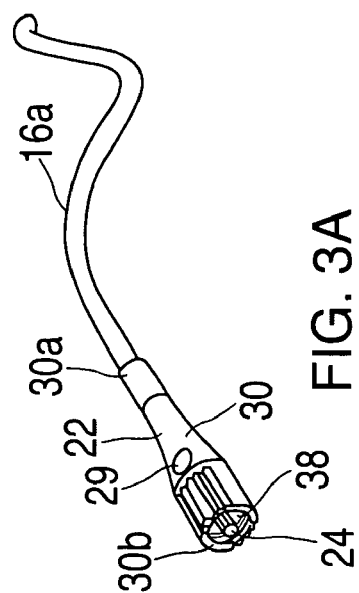
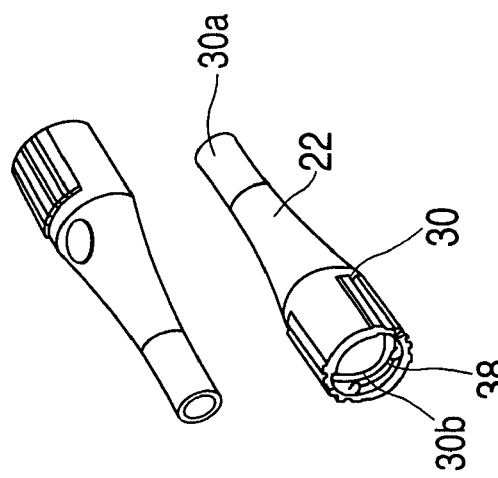
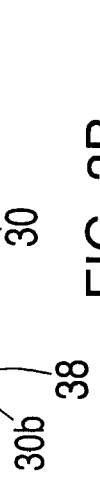
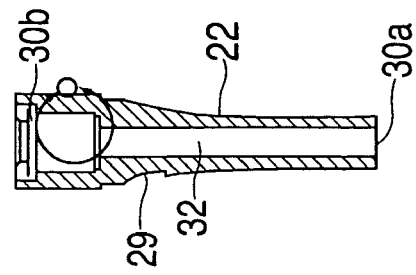
FIG. 3A
FIG. 3B
FIG. 5A
FIG. 5B
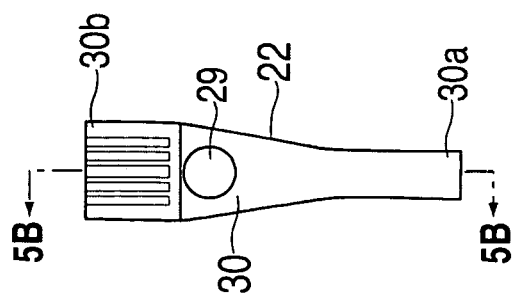
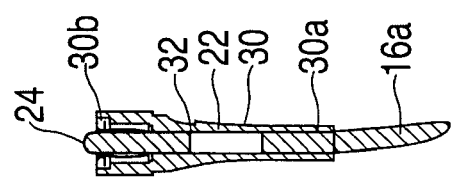
FIG. 4

IRRIGATION CONTROL SYSTEM

FIELD OF THE INVENTION

The invention relates to an irrigation electrical control system. In particular, an irrigation system is provided with an improved device that facilitates the coupling of electrical connections and testing of electrical components.

BACKGROUND OF THE INVENTION

Since about forty years ago, automatic and semi-automatic controlled irrigation systems use direct burial station wires and a common wire with permanent splices to connect irrigation or sprinkler valves to the master control. Each valve, which has an electrically actuated solenoid, is permanently connected to the buried field wires. Each valve has two wires connected to it, a station wire connected directly to the master control and one or more common wire that are connected in parallel to all other valves before connecting to the master control. The need to place such an irrigation electrical system underground requires the electrical connection to be securely sealed against moisture and fluid. Such buried wires and connections create problems whenever checking or repairs are required.

A number of prior art waterproof electrical splices have been used in the irrigation industry. Many of these prior art splices utilize water proof materials, such as grease or epoxy, to seal the ends of the electrical connections. Such materials are generally very messy to handle. Another type of prior art splice utilizes heat-shrink material and plastic sleeves pre-filled with a sealant to encapsulate the connection. Such prior art splices are also inefficient because testing of a prior art irrigation system generally requires the nicking or cutting of the conductor, often in a trench or hole, in order to access the wire with a volt ohm meter or other diagnostic tool test leads. The removal of the waterproofing material prevents reusing the connection after a test or repair. Thus, a new connector that is waterproof is required.

When a stoppage or malfunction occurs in the irrigation electrical system, it normally requires disconnecting that portion of the system containing the malfunctioning component. Oftentimes, the valve is in an opening, box or trench, which contains water from the system, making working on the valve difficult.

Therefore, there is a need for an irrigation electrical control system using remote control valve connectors that facilitate and simplify the connections and testing of electrical components in an irrigation system.

SUMMARY OF THE INVENTION

The present invention provides an irrigation control system with a waterproof coupling device to achieve electrical connections with a quick and easy electrical accessibility for testing electrical components in an irrigation system.

The irrigation control system of the present invention comprises an electrical master control, electrically controlled remote control valves ("RCV") and at least two coupling devices that interconnect the electrical conductors to the remote control valves.

The coupling device of the present invention comprises two elements, a male connector housing and a female connector housing. Each connector housing having first and second ends, with each first end connected to an electrical cable and/or wire with a waterproof material. The male connector housing comprises a generally cylindrical single molded piece having a tubular cavity with a male connector internally and axially positioned at the second end of the housing. The female connector housing comprises a generally cylindrical single molded piece with a female connector at its second end that correspondingly mates with the male connector. About the circumferential surface of the second end of the female connector housing is at least one sealing o-ring. The tubular cavity of the male connector housing engages the second end of the female connector housing over the O-rings upon connection or mating of the male and female connectors to provide a watertight seal. The male and female connector housings, when connected, may be held together by various means, such as friction, latching mechanism or cam lock.

The electrical coupling device facilitates electrical accessibility and ease for testing the electrical controls and/or remote control valves in the irrigation control system. The male and female connector housings of the coupling device may be easily disconnected at the site to allow for replacement of the resistor load or solenoid for test purposes and then easily reconnected to test and if satisfactory, then securely and sealingly reconnect for operation of the irrigation control system. The coupling device may be connected and disconnected repeatedly and at will without the need to replace the entire coupling device.

BRIEF DESCRIPTION OF THE DRAWINGS

A preferred embodiment of the present invention has been chosen for purposes of illustration and description and is shown in the accompanying drawings forming a part of the specification wherein:

FIGS. 3A and 3B are perspective views of the male connector housing, with and without the male connector, respectively.

FIG. 4 is a side view of the male connector housing without the male connector.

FIGS. 5A and 5B are cross sectional views of the male connector housing, with and without the male connector, respectively, taken from line 5—5 of FIG. 4.

DETAILED DESCRIPTION OF THE PREFERRED EMBODIMENTS

Figure 1:
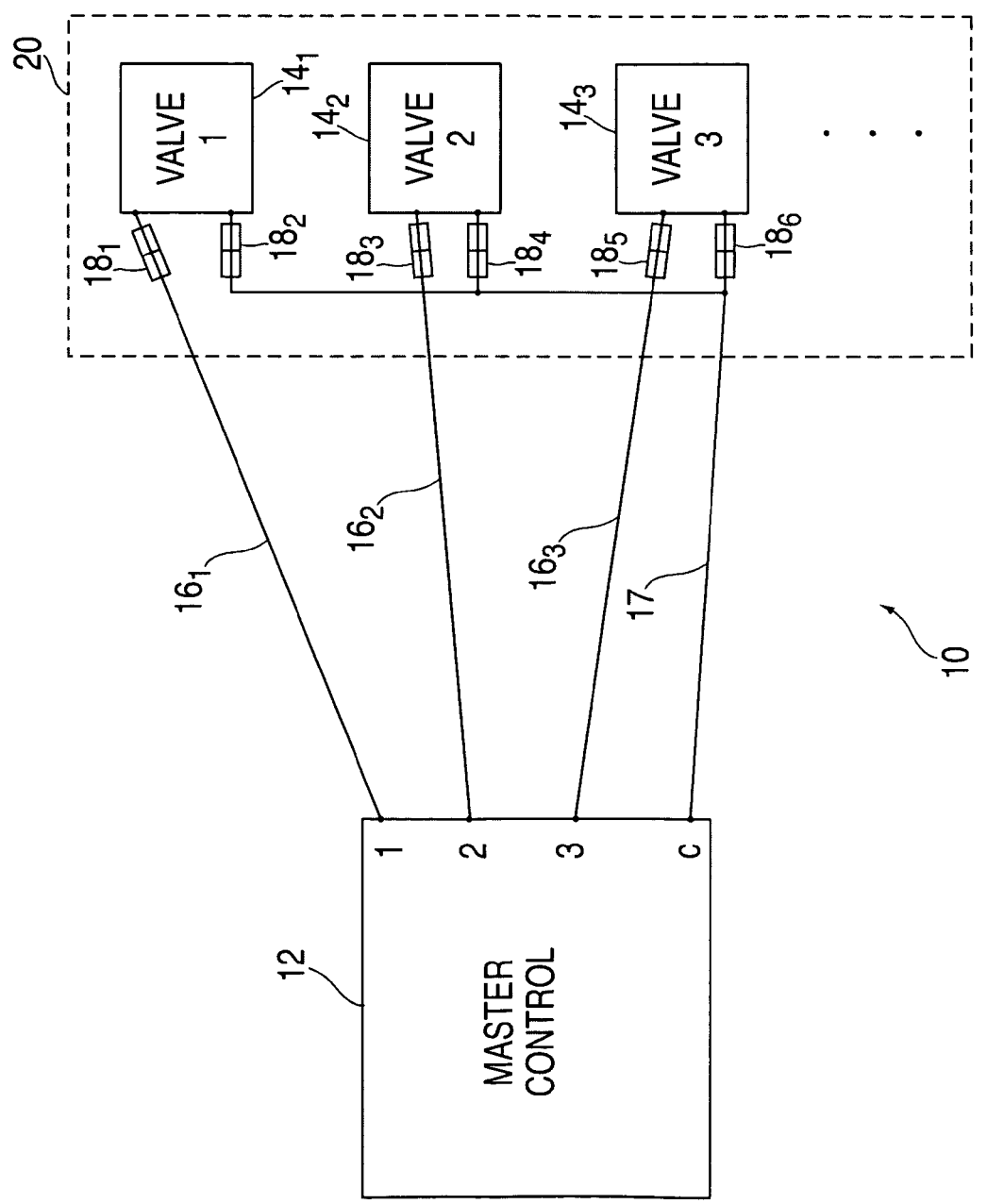
FIG. 1 is a schematic of the irrigation electrical control system of the present invention.

With reference to the drawings, wherein the same reference number indicates the same element throughout, there is shown in FIG. 1 an irrigation control system 10 of the present invention. The irrigation control system 10 comprises an electrical master control 12 and a plurality of valves 14 connected to the master control 12 via a plurality of station wires 16 and a common wire 17 ("C"). Each wire 16 and 17 connecting each valve 14 to the master control 12 has a coupling device 18. Normally, each of the coupling devices 18 is conveniently located in a remote control valve box or junction box 20 in the field with its corresponding valve 14, to facilitate access and testing of the system 10. Even though the valve box 20 provides some protection to the coupling device 18 from the elements, it is still necessary that the coupling device 18 be securely sealed and waterproofed because water and moisture oftentimes seep into the valve box 20, or leaks into the valve box 20 from the valves 14. As an example, the master control 12 can be a lawn sprinkler time clock and the valve 14 may be individual irrigation valve solenoids. However, a different master control 12 and/or valve 14 may be substituted, as generally known to one having skill in the art of irrigation control systems.

Figure 2:
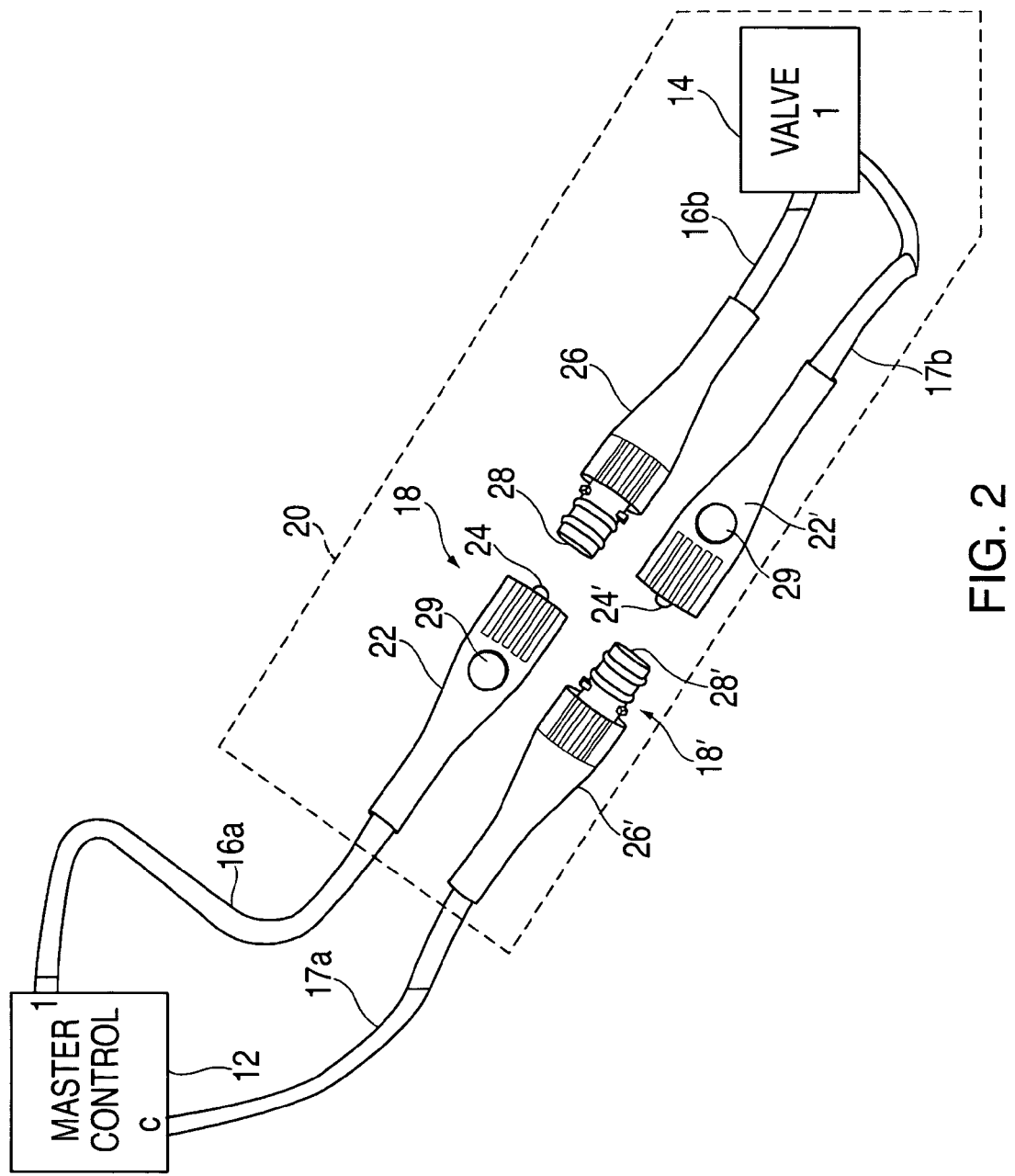
FIG. 2 is a perspective view of the coupling devices of the present invention.
Figure 8:
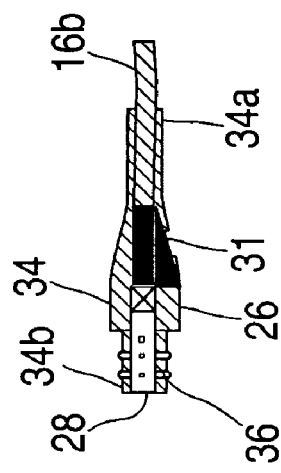
FIG. 8 is a cross sectional view of the female connector housing taken from line 8—8 of FIG. 7.
Figure 9A:
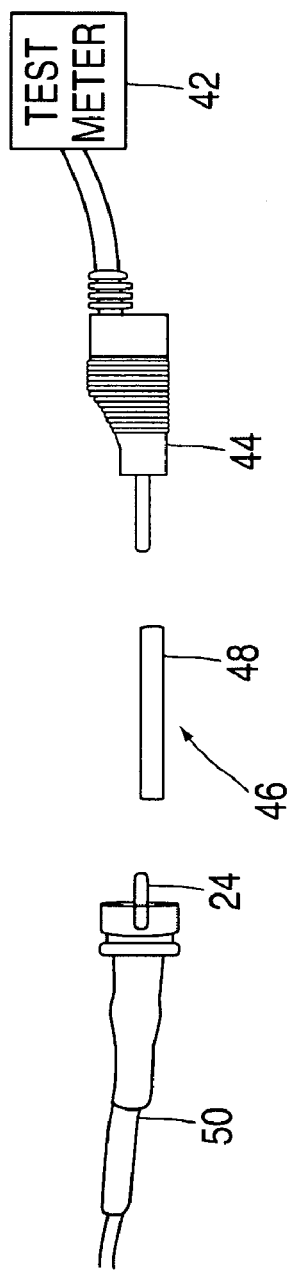
FIGS. 9A and 9B illustrate a test lead adaptor for use with the male connector housing to allow connection to testing equipment.

FIG. 2 shows two coupling devices 18 and 18' in a valve box 20 of the present invention interconnecting the master control 12 and the valve 14. Each coupling device 18 and 18' comprises a male connector housing 22 and 22' with a male connector 24 and 24' and a female connector housing 26 and 26' with a female connector 28 and 28', respectively. A small flat surface 29 and 31 (as shown in FIG. 2 and FIG. 8) on each of the male connector housing 22 and female connector housing 24, respectively, is provided for labeling or marking the identification of the connection. Station wire 16a interconnects the male connector housing 22 and the master control 12. Station wire 16b interconnects the female connector housing 26 and the valve 14. Common wire 17a interconnects the female connector housing 26' to the master control 12. Common wire 17b interconnects the male connector housing 22' to valve 14. Coupling devices 18 and 18' securely seal and waterproof the connection between wires 16a and 16b and the male and female connector housings 22 and 26, respectively. Wires 17a and 17b and the female and male connector housings 26' and 22', respectively, may be sealed and waterproofed with a waterproof joint compound (epoxy), prior art heat shrink material, electrical crimp, compression collar and ferrel or o-ring or gasket connected with threads, as known to one skill in the art of irrigation control systems. The male and female connectors 24, 24', 28 and 28', may also be attached to a piece of wire (heat fused) during the manufacturing process, as shown in FIG. 9A as connection 50. The short piece of wire that is factory connected can then be connected for use in the field by any means necessary at the installers' discretion but preferably with a dual wall epoxy lined heat shrink tubing known to one skill in the art of irrigation control systems.

As shown in FIGS. 3A, 3B, 4, 5A and 5B, the male connector housing 22 has a generally cylindrical body 30 of a single molded piece. The cylindrical body 30 has a tubular cavity 32. Housed axially within and extending from the tubular cavity 32 from the second end 30b of the body 30 is the male connector 24, which is shown to be a standard banana plug known to one skilled in the art. However, different sized banana plug can be used. The male connector 24 is connected to wire 16a, as shown in FIG. 5A, which extends from the first end 30a of body 30. Adjacent the second end 30b of the body 30 within the wall of the tubular cavity 32 is a groove 38 that correspondingly mates with a latching element 40 of the female connector housing 26, to be described with respect to FIGS. 6 and 7 below.

Figure 7:
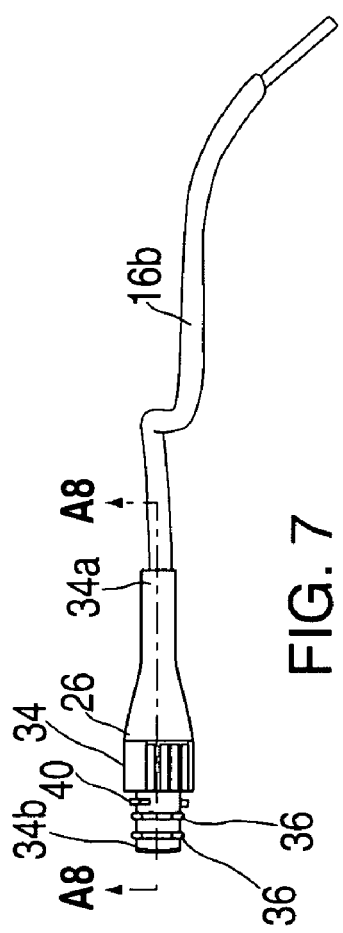
FIG. 7 is a side view of the female connector housing.
Figure 6:
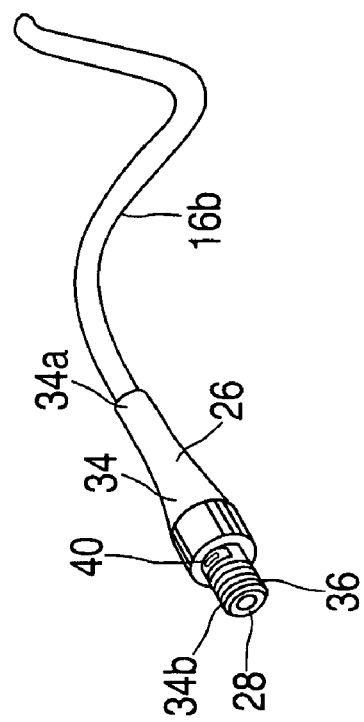
FIG. 6 is a perspective view of the female connector housing.

As shown in FIGS. 6, 7 and 8, the female connector housing 26 has a generally cylindrical body 34 of a single molded piece. The first end 34a of body 34 is connected to wire 16b, and the second end 34b of body 34 houses the female connector 26, which correspondingly mates with the male connector 24. The female connector 26 is a standard banana jack known to one skilled in the art. However, different sized banana jack can be used. Mounted about the circumferential outer surface of the second end 34b of the body 34 is at least one sealing o-ring 36. At least one o-ring 36 may be integral with the body 34 or removable. The tubular cavity 32 of the cylindrical body 30 of the male connector housing 22 correspondingly engages the second end 34b of the body 34 of the female connector housing 26 over the o-ring upon connection of the male and female connectors 24 and 26 to provide a watertight seal. A latching element 40 is provided at the second end 34b of the body 34 to correspondingly mate with the groove 38 in the tubular cavity 32 to hold the male and female connector housings 22 and 26 together. Other methods of holding the male and female connector housings 22 and 26 together may be used, such as by friction, latching mechanism or cam lock.

Figure 9B:
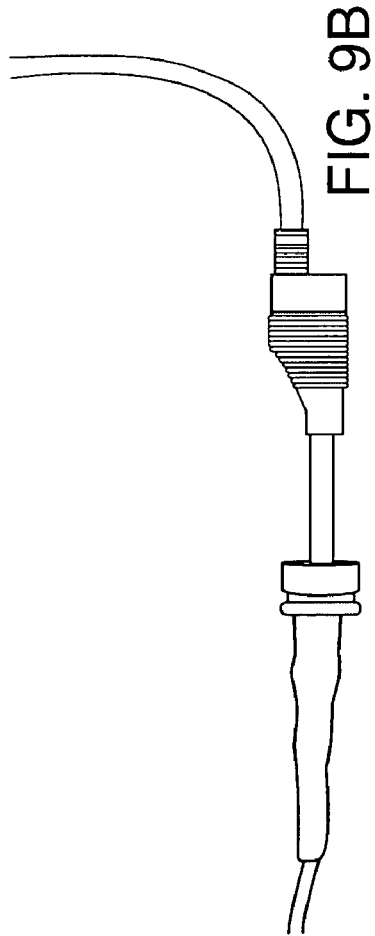

FIGS. 9A and 9B illustrates the ease of disconnecting the coupling device 18 of the present invention for connection to a test meter 42. A test meter generally has a standard banana plug as a test lead 44, which may be plugged into the standard banana jack of the female connector 26 for testing purposes (not shown). However, to connect the test lead 44 to the banana plug of the male connector 24, a test lead adaptor 46 ("TLA") is necessary. Test lead adaptor 46 has a tubular shape body 48 that fits around the male connector 24 and the test lead 44 to allow electrical connection between the two. Test lead adaptor 46 is preferably insulated to maintain circuit integrity and to provide safety to the end user.

Figure 10:
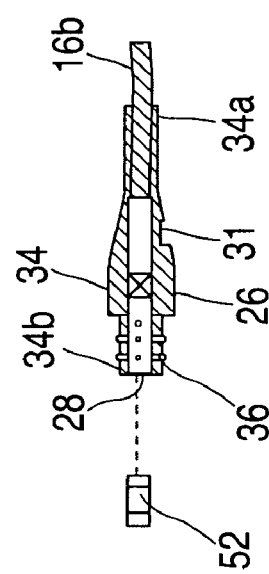
FIG. 10 illustrates a fuse to be inserted into the female connector housing.

As shown in FIG. 10, coupling device 18 may be a fused connector by inserting a fuse 52 into the female connector 28 prior to interconnection with the male connector 24. Such a fused coupling device prevents overload.

Figure 11B:
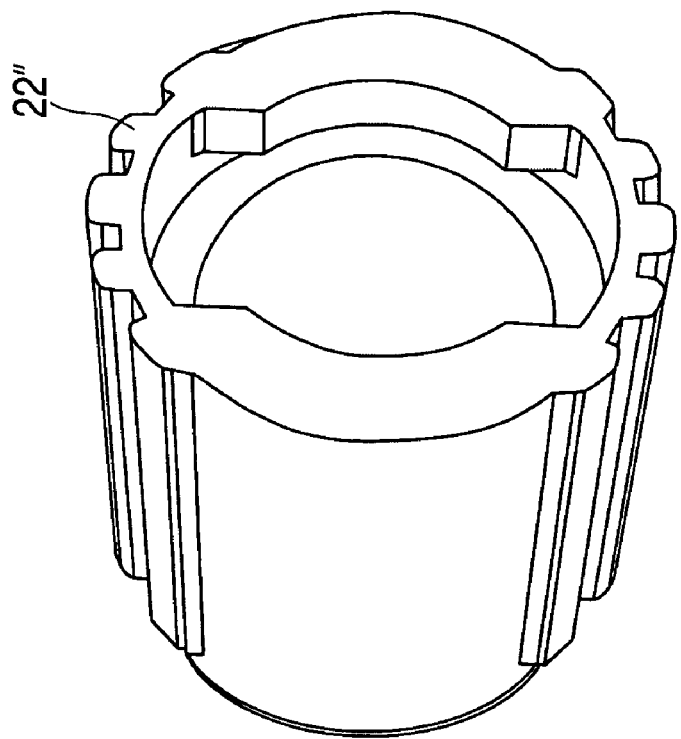
FIGS. 11A and 11B are perspective views of a female cap and a male cap, respectively.
Figure 11A:
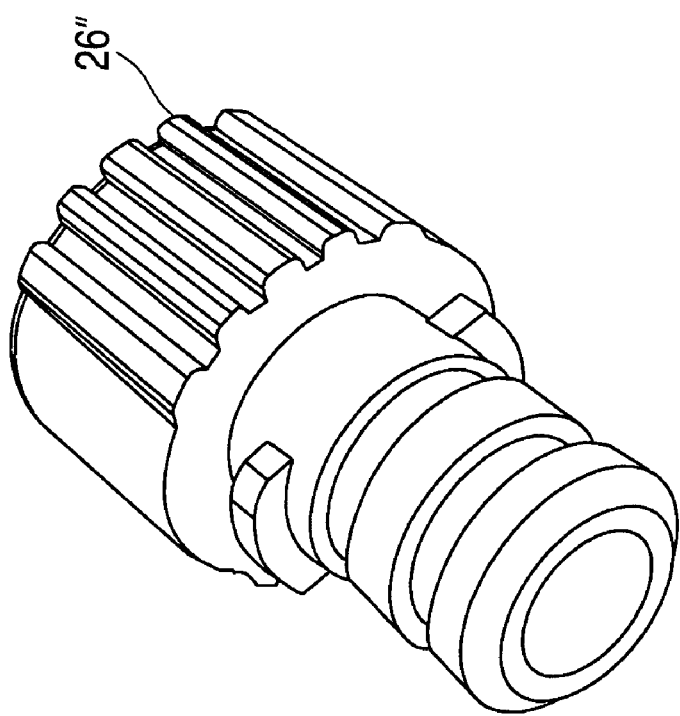

As shown in FIGS. 11A and 11B, in situations where either a male connector housing 22 or a female connector housing 26 is an open ended connection, a corresponding female cap 26" or a corresponding male cap 22", respectively, may be used to seal and cap the open connection. The female cap 26" is similar in construction as the female connector housing 26 without any wires extending therefrom and the male cap 22" is similar in construction as the male connector housing 22 without any wires extending therefrom.

The construction of the present invention eliminates the need to cut into the cable 16 to make an electrical connection with valve 14 and master control 12 for testing purposes. The coupling device 18 of the present invention provides waterproof sealing that facilitates disconnection and reconnection without the need of waterproof epoxy or grease.

The features of the invention illustrated and described herein is the preferred embodiment. Therefore, it is understood that the appended claims are intended to cover unforeseeable embodiments with insubstantial differences that are within the spirit of the claims.

We claim:

1. An irrigation control system having a master control, comprising:

a plurality of electrical irrigation components adapted to be controlled by the master control and at least two waterproof coupling devices adapted to interconnect the master control and at least one of said electrical irrigation components to facilitate coupling and testing of the said electrical irrigation component, each of said waterproof coupling device comprises:

a male connector housing having a generally cylindrical body with first and second ends, a male connector axially positioned in said body of said male connector housing and extending from said second end of said body of said male connector housing and said first end is adapted to connect to the master control or one of said electrical irrigation components;

a female connector housing comprises a generally cylindrical body having first and second ends, a female connector axially positioned at said second end of said female connector housing in said body of said female connector housing and said first end of said female connector housing is connected to another one of said electrical irrigation components, said female connector cooperatively mating with a corresponding male connector;

at least one curved groove and an opening for accessing said curved groove adjacent said second end of said body of said male connector housing and at least one protruding latching element adjacent said second end of said body of said female connector housing for engaging said groove upon inserting said protruding latching element into said opening and rotating said female connector housing with respect to the male connector housing to sealingly hold said male connector housing to said corresponding female connector housing when said male connector is matingly connected to said corresponding female connector; and means for waterproof sealing said male connector housing to said corresponding female connector housing when said male connector is matingly connected to said corresponding female connector; and means for preventing overloading of the irrigation control system, wherein said preventing means comprises a fuse inserted into said female connector prior to cooperative mating with said male connector.

2. The system of claim 1 wherein said male connector housing further comprises a tubular cavity, said male connector axially positioned in said tubular cavity.

3. The system of claim 2 wherein said second end of said body of said female connector housing matingly engages said tubular cavity of said male connector housing when said male connector is matingly connected to said female connector.

4. The system of claim 1 wherein said second end of said body of said female connector having a circumferential surface and said sealing means comprises at least one o-ring around said circumferential surface of said second end of said body of said female connector.

5. The system of claim 4 wherein said at least one o-ring is integral to said female connector.

6. The system of claim 4 wherein said at least one o-ring is removable.

7. The system of claim 1 wherein each of said male connector housing and said female connector housing is made of a single molded piece.

8. The system of claim 1 further comprising means for identifying each male and female connector housing.

9. The system of claim 8 wherein said identifying means comprises a flat surface on each of said male and female connector housing.

10. The system of claim 1 further comprising a female cap for sealingly capping an open end of one of said male connector housing.

11. The system of claim 1 further comprising a male cap for sealingly capping an open end of one of said female connector housing.

12. An irrigation control system having a master control, comprising:

a plurality of electrical irrigation components adapted to be controlled by the master control, and at least two waterproof coupling devices adapted to interconnect the master control and said electrical irrigation components to facilitate coupling and testing of the said electrical irrigation components, each waterproof coupling device comprises:

a male connector housing having a generally cylindrical body with first and second ends, a male connector axially positioned in said body of said male connector housing and extending from said second end of said body of said male connector housing and said first end is connected to one of said electrical irrigation component;

a female connector housing having a generally cylindrical body with first and second ends, a female connector axially positioned at said second end of said female connector housing in said body of said female connector housing and said first end of said female connector housing is adapted to connect to the master control or another one of said electrical irrigation components, said female connector cooperatively mating with a corresponding male connector;

at least one curved groove and an opening for accessing said curved groove adjacent said second end of said body of said male connector housing and at least one protruding latching element adjacent said second end of said body of said female connector housing for engaging said groove upon inserting said protruding latching element into said opening and rotating said female connector housing with respect to the male connector housing to sealingly hold said male connector housing to said corresponding female connector housing when said male connector is matingly connected to said corresponding female connector; and means for waterproof sealing said male connector housing to said corresponding female connector housing when said male connector is matingly connected to said corresponding female connector; and means for preventing overloading of the irrigation control system, wherein said preventing means comprises a fuse inserted into said female connector prior to cooperative mating with said male connector.

* * * * *